(No Model.)
J. D. SMITH & T. H. DUHART.
FOOD MILL.
No. 464,832. Patented Dec. 8, 1891.
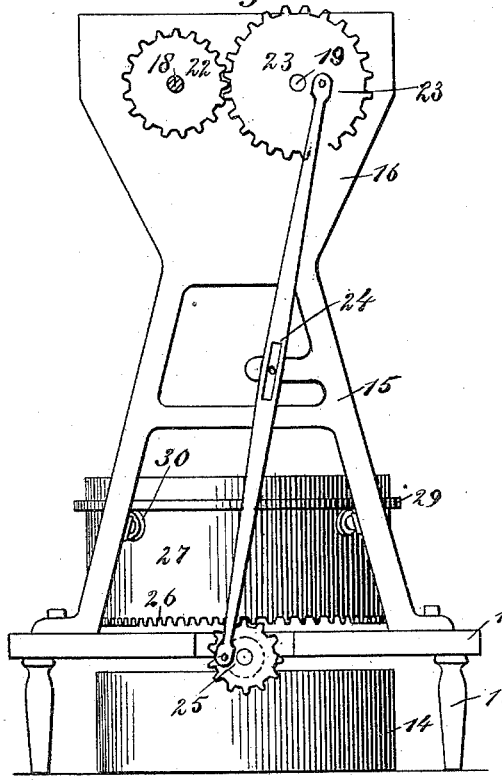
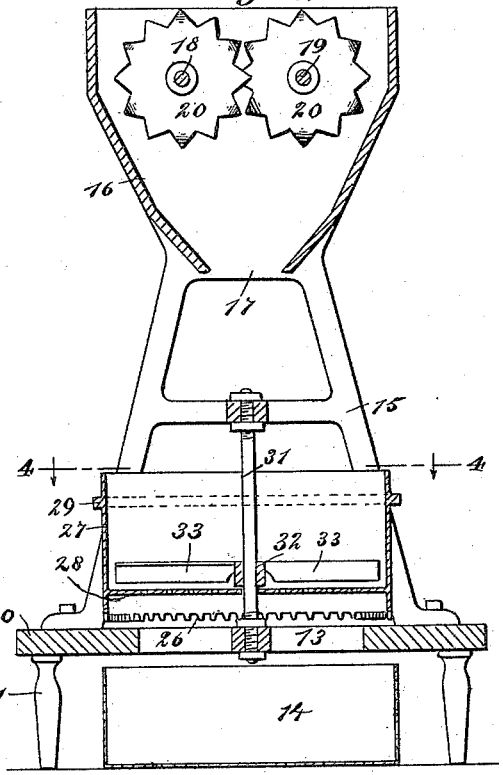
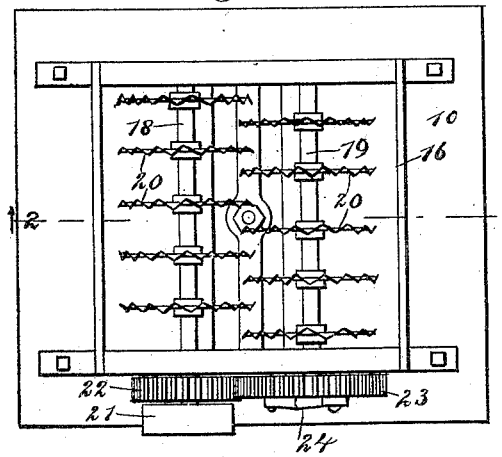
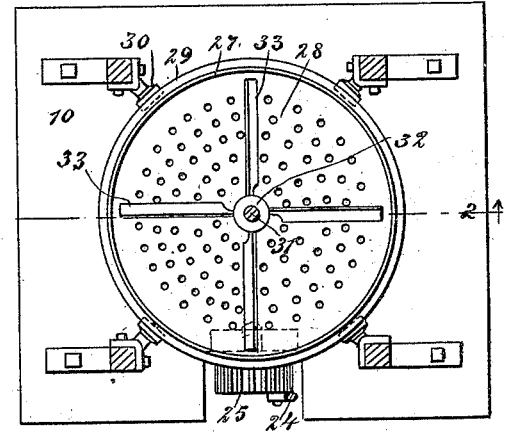
WITNESSES:
J. A. Criswell
C. Sedgwick
INVENTORS
J. D. Smith
T. H. Duhart
BY
ATTORNEYS

UNITED STATES PATENT OFFICE.

JAMES D. SMITH AND THOMAS H. DUHART, OF WORCESTER, MASSACHUSETTS.

FOOD-MILL.

SPECIFICATION forming part of Letters Patent No. 464,832, dated December 8, 1891.

Application filed May 21, 1891. Serial No. 393,519. (No model.)

*To all whom it may concern:*

Be it known that we, JAMES D. SMITH and THOMAS H. DUHART, both of Worcester, in the county of Worcester and State of Massachusetts, have invented a new and Improved Food-Mill, of which the following is a full, clear, and exact description.

Our invention relates to improvements in food-mills; and the object of our invention is to produce a simple and convenient device by means of which bread and similar articles may be rapidly crumbed.

To this end our invention consists in certain features of construction and combinations of parts, which will be described and claimed.

Reference is to be had to the accompanying drawings, forming a part of this specification, in which similar figures of reference indicate corresponding parts in all the views.

Figure 1 is a side elevation of a machine embodying our invention. Fig. 2 is a vertical section of the same on the line 2 2 in Figs. 3 and 4. Fig. 3 is a plan view of the machine, and Fig. 4 is a sectional plan on the line 4 4 in Fig. 2.

The machine is provided with a base 10, which stands upon legs 11, and which has a central aperture 13, so that the crumbs may drop through it in the manner hereinafter described. The legs 11 raise the base sufficiently for a receptacle 14 to be placed beneath it to receive the crumbs; but if desired the base may be bolted to any convenient support. On the upper side of the base is a frame 15, which terminates at the top in a hopper 16, and the hopper has a central lower opening 17, through which the crumbs descend. Extending transversely through the upper portion of the hopper are shafts 18 and 19, which are provided with circular saws 20, the teeth of which are arranged in a somewhat zigzag manner, and this construction of the teeth enables them to easily crumb the bread or other material which comes in contact with them.

The shaft 18 is provided at its outer end with a driving-pulley 21, and if a small machine is used a crank may be substituted for the pulley. The shaft 18 is also provided with a gear-wheel 22, which meshes with a similar gear-wheel 23 on the shaft 19, so that the two shafts will turn together, and the gear-wheel 23 is connected by means of a pitman 24 with a gear-wheel 25, which is pivoted on one side of the base 10, and which meshes with the teeth 26 on the lower edge of the cylinder 27. The pitman 24 is provided centrally with a common form of sliding pivot 24ª, as shown in Fig. 1, to enable it to impart a complete revolution to the gear-wheel 25. This cylinder is mounted in the frame 15 immediately above the aperture 13 of the base and below the opening 17 in the hopper 16, and it is provided with a perforated bottom 28, through which the crumbs are forced, in a manner hereinafter described. The cylinder is provided with a flange 29 near the top, which rests upon rollers 30, which rollers are pivoted on the frame 15, and the cylinder will thus be enabled to turn easily, although the manner of its support is not essential.

A shaft 31 extends centrally through the cylinder, being held in suitable supports on the frame 15 and base 10; and radiating from a hub 32, which is secured to the shaft immediately above the bottom 28 of the cylinder, is a series of knives 33, which are preferably somewhat inclined, so that they will ride easily upon the crumbs in the cylinder, and the knives are arranged so that their lower edges will nearly touch the bottom of the cylinder.

To operate the machine it is simply set in motion and the bread or other material to be crushed or crumbed is poured into the hopper. The material will first come in contact with the revolving saws 20, which will tear it to shreds, and these will drop through the opening 17 in the hopper and into the cylinder 27. The revolution of the cylinder will bring the particles of matter to be crumbed beneath the lower edges of the knives, and the knives will force the material through the perforations in the bottom 28 and into the receptacle 14. It will thus be seen that a large quantity of material may be quickly and nicely crumbed.

It is obvious that instead of revolving the cylinder 27 it may be made stationary and the knives 23 revolved with substantially the same effect.

Having thus fully described our invention we claim as new and desire to secure by Letters Patent—

1. A food-mill comprising a horizontally-revoluble cylinder having a perforated bottom, a plurality of inclined knives held within the cylinder adjacent to the bottom, a hopper mounted above the cylinder and adapted to deliver therein, a series of saws mounted in the hopper, and mechanism for revolving the saws and cylinder, substantially as described.

2. A food-mill comprising an apertured base, a horizontally-revoluble cylinder held to turn on the base, the cylinder having a perforated bottom, a plurality of inclined knives mounted in the cylinder adjacent to and parallel with the bottom, a hopper supported above the cylinder and adapted to deliver therein, a series of saws mounted in the hopper, and gear mechanism for turning the saws and cylinder, substantially as described.

JAMES D. SMITH.
THOMAS H. DUHART.

Witnesses:
W. O. JOHNSON,
EDWARD SCOTT.